United States Patent
Hosono

(10) Patent No.: US 8,924,918 B2
(45) Date of Patent: Dec. 30, 2014

(54) EVALUATION APPARATUS, AN EVALUATION METHOD AND AN EVALUATION PROGRAM STORING MEDIUM

(71) Applicant: Shigeru Hosono, Tokyo (JP)

(72) Inventor: Shigeru Hosono, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/001,109

(22) PCT Filed: Dec. 12, 2012

(86) PCT No.: PCT/JP2012/007926
§ 371 (c)(1),
(2), (4) Date: Aug. 22, 2013

(87) PCT Pub. No.: WO2013/108334
PCT Pub. Date: Jul. 25, 2013

(65) Prior Publication Data
US 2014/0325471 A1    Oct. 30, 2014

(30) Foreign Application Priority Data

Jan. 18, 2012 (JP) ................................ 2012-007855

(51) Int. Cl.
*G06F 9/44* (2006.01)
*G06Q 10/06* (2012.01)

(52) U.S. Cl.
CPC ............ *G06F 8/70* (2013.01); *G06Q 10/06398* (2013.01)
USPC ........................................................ 717/101

(58) Field of Classification Search
USPC ........................................................... 100/101
See application file for complete search history.

(56) References Cited

U.S. PATENT DOCUMENTS

| 2013/0179359 A1* | 7/2013 | Burns et al. .................... 705/325 |
| 2013/0238785 A1* | 9/2013 | Hawk et al. .................... 709/224 |
| 2013/0297218 A1* | 11/2013 | Bangera et al. ................. 702/19 |

FOREIGN PATENT DOCUMENTS

| JP | 11-296461 A | 10/1999 |
| JP | 2001-22613 A | 1/2001 |
| JP | 2003-150644 A | 5/2003 |
| JP | 2004-54606 A | 2/2004 |
| JP | 2004-252946 A | 9/2004 |
| JP | 2006-92368 A | 4/2006 |
| JP | 2008-257539 A | 10/2008 |
| JP | 2011-86231 A | 4/2011 |

* cited by examiner

*Primary Examiner* — Anna Deng
(74) *Attorney, Agent, or Firm* — Sughrue Mion, PLLC

(57) ABSTRACT

An apparatus comprises a worker information storage unit for storing a table including, for each of a plurality of workers engaged in work of development or operation of a system, a period in which the worker possessed one of a plurality of work attributes concerning to the work, a log storage unit for storing a work log recording, for each interaction among the workers, generation time of the interaction and the workers who participated in the interaction, and an evaluation unit for calculating from the work log and outputting relation strength, for each combination of the work attributes and the pairs of the workers, that indicates the strength of the relation between the workers composing the pair, based on number of times of the interactions within the pair that the workers performed when having the work attribute.

25 Claims, 13 Drawing Sheets

|  | a | b1 | b2 | b3 | b4 | b5 | c1 | c2 | c3 | c4 | c5 | c6 | c7 | c8 | c9 |
|---|---|---|---|---|---|---|---|---|---|---|---|---|---|---|---|
| WORKERa |  | 0.4 |  |  |  |  |  |  |  |  |  |  |  |  |  |
| WORKERb1 | 0.4 |  | 1.0 | 1.0 | 0.6 | 0.6 |  |  |  |  |  |  |  |  |  |
| WORKERb2 |  | 1.0 |  | 0.6 | 1.0 | 0.6 |  |  |  |  |  |  |  |  |  |
| WORKERb3 |  | 1.0 | 0.6 |  | 0.6 | 1.0 |  |  |  |  |  |  |  |  |  |
| WORKERb4 |  | 0.6 | 1.0 | 0.6 |  | 0.6 |  |  |  |  |  |  |  |  | 0.4 |
| WORKERb5 |  | 0.6 | 0.6 | 1.0 | 0.6 |  |  |  |  |  |  |  |  |  | 0.4 |
| WORKERc1 |  |  |  |  |  |  |  | 0.6 | 1.0 | 0.3 | 0.3 | 0.3 | 0.3 |  |  |
| WORKERc2 |  |  |  |  |  |  | 0.6 |  | 1.0 | 0.3 | 0.3 | 0.3 | 0.3 |  |  |
| WORKERc3 |  |  |  |  |  |  | 1.0 | 1.0 |  | 0.3 | 0.3 | 0.3 | 0.3 |  |  |
| WORKERc4 |  |  |  |  |  |  | 0.3 | 0.3 | 0.3 |  | 0.6 | 1.0 | 0.3 |  |  |
| WORKERc5 |  |  |  |  |  |  | 0.3 | 0.3 | 0.3 | 0.6 |  | 1.0 | 0.3 |  |  |
| WORKERc6 |  |  |  |  |  |  | 0.3 | 0.3 | 0.3 | 1.0 | 1.0 |  | 0.3 |  |  |
| WORKERc7 |  |  |  |  |  |  | 0.3 | 0.3 | 0.3 | 0.3 | 0.3 | 0.3 |  | 0.3 | 0.3 |
| WORKERc8 |  |  |  |  |  |  |  |  |  |  |  |  | 0.3 |  | 0.6 |
| WORKERc9 |  |  |  |  | 0.4 | 0.4 |  |  |  |  |  |  | 0.3 | 0.6 |  |

(b)

|  | a | b1 | b3 | b5 | b2 | b4 | c9 | c8 | c7 | c4 | c6 | c5 | c2 | c3 | c1 |
|---|---|---|---|---|---|---|---|---|---|---|---|---|---|---|---|
| WORKERa |  | 0.4 |  |  |  |  |  |  |  |  |  |  |  |  |  |
| WORKERb1 | 0.4 |  | 1.0 | 0.6 | 1.0 | 0.6 |  |  |  |  |  |  |  |  |  |
| WORKERb3 |  | 1.0 |  | 1.0 | 0.6 | 0.6 |  |  |  |  |  |  |  |  |  |
| WORKERb5 |  | 0.6 | 1.0 |  | 0.6 | 0.6 | 0.4 |  |  |  |  |  |  |  |  |
| WORKERb2 |  | 1.0 | 0.6 | 0.6 |  | 1.0 |  |  |  |  |  |  |  |  |  |
| WORKERb4 |  | 0.6 | 0.6 | 0.6 | 1.0 |  | 0.4 |  |  |  |  |  |  |  |  |
| WORKERc9 |  |  | 0.4 |  | 0.4 |  |  | 0.6 | 0.3 |  |  |  |  |  |  |
| WORKERc8 |  |  |  |  |  |  | 0.6 |  | 0.3 |  |  |  |  |  |  |
| WORKERc7 |  |  |  |  |  |  | 0.3 | 0.3 |  | 0.3 | 0.3 | 0.3 | 0.3 | 0.3 | 0.3 |
| WORKERc4 |  |  |  |  |  |  |  |  | 0.3 |  | 1.0 | 0.6 | 0.3 | 0.3 | 0.3 |
| WORKERc6 |  |  |  |  |  |  |  |  | 0.3 | 1.0 |  | 1.0 | 0.3 | 0.3 | 0.3 |
| WORKERc5 |  |  |  |  |  |  |  |  | 0.3 | 0.6 | 1.0 |  | 0.3 | 0.3 | 0.3 |
| WORKERc2 |  |  |  |  |  |  |  |  | 0.3 | 0.3 | 0.3 | 0.3 |  | 1.0 | 0.6 |
| WORKERc3 |  |  |  |  |  |  |  |  | 0.3 | 0.3 | 0.3 | 0.3 | 1.0 |  | 1.0 |
| WORKERc1 |  |  |  |  |  |  |  |  | 0.3 | 0.3 | 0.3 | 0.3 | 0.6 | 1.0 |  |

US 8,924,918 B2

EVALUATION APPARATUS, AN EVALUATION METHOD AND AN EVALUATION PROGRAM STORING MEDIUM

CROSS REFERENCE TO RELATED APPLICATIONS

This application is a National Stage of International Application No. PCT/JP2012/007926, filed on Dec. 12, 2012, which claims priority from Japanese Patent Application No. 2012-007855, filed on Jan. 18, 2012, the contents of all of which are incorporated herein by reference in their entirety.

TECHNICAL FIELD

The present invention relates to an evaluation apparatus, an evaluation method and an evaluation program, in particular, an evaluation apparatus, an evaluation method and an evaluation program for evaluation of organizations for system development and operation.

BACKGROUND ART

Along with the reduction of a software development period, the expectation to the agile development and the iteration development has increased. These development methods have a variety of new features that have not been found in the waterfall type development such as that the response to the change is esteemed or that a customer participates in development closely.

As the difference between the agile development and the waterfall type development, the ability requested for an engineer is mentioned. In case of the waterfall type development, for example, a test engineer has only to perform the testing, a coding engineer has only to write a code following to a specification and it is not often necessary to concern the works other than those. On the other hand, in order to complete the software which runs briefly in a short period, an engineer with a skill enough to cover all processes of the software development by himself is needed. Agile development can consist only by constructing a project team composed of skilled engineers beyond a certain level.

Accordingly, in agile development or the like, it is necessary to clarify the human resource plan or the management method, such as, who is appropriate as a project leader to control the team members, how many persons, which process, what role are appropriate for the participation of the skilled engineers beyond a certain level, or the role should be main job or additional job.

It is effective for the development which has already finished performing the development organization evaluation such as taking the log in concerning to the communication of developing persons, each role of developing persons or the leadership level of the project leader. Further, the requirement mentioned above also exists concerning to a system operation.

The apparatus which the patent document 1 discloses is judged to have a link between the individual persons when the measured variable (the number of the meeting, the total time and the number of mails) of the communication log between the individual persons in an observation period exceeds the predetermined threshold value. Based on the number of the links which a certain individual possesses with other individuals, the apparatus calculates and outputs an index which shows how central personage the individual is.

The patent document 2 discloses an apparatus which evaluates the organization value by analyzing what kind of contents of the communication occurs inside the organization, what range and scale it is used, in the other organizations. Patent document 3 discloses an apparatus which registers the association of various sorts of information. Patent document 4 discloses a client apparatus which searches a log file.

THE PRECEDING TECHNICAL LITERATURE

Patent Document

[Patent document 1] number 2008-257539 Unexamined Patent Publication information
[Patent document 2] number 2004-252946 Unexamined Patent Publication information
[Patent document 3] number 2003-150644 Unexamined Patent Publication information
[Patent document 4] number 2001-22613 Unexamined Patent Publication information

DISCLOSURE OF THE INVENTION

Problem to be Solved

In order to make a plan of human resources and management method clear, a log analysis is needed with the distinction of the attributes of development works such as processes or roles. According to the attribute of works, the plan of human resources and the management method of the development organization are expected to change.

In the analysis, the technology disclosed in patent document 1 mentioned above does not consider the attributes of works such as the processes or the roles. An object of the present invention, which settles the problem, mentioned above, is to provide an evaluation apparatus, an evaluation method and an evaluation program, which can perform the organization evaluation with the distinction of the attributes of development or management works.

Means for Settling a Problem

An evaluation apparatus of one embodiment of the present invention comprises a worker information storage means for storing a work table including, for each of a plurality of workers who are engaged in work of development or operation of a system, a period in which the worker possessed any one of a plurality of work attributes concerning to said work,
a log storage means for storing a work log recording, for each interaction among said plurality of workers, generation time of said interaction and said workers who participated in said interaction, and an evaluation means for calculating from said work log and outputting relation strength, for each combination of said plurality of work attributes and said plurality of pairs of the workers, that indicates the strength of the relation between the workers composing the pair, based on number of times of said interactions within the pair that the workers composing the pair performed when having the work attribute.

An evaluation program of one embodiment of the present invention makes a computer execute, a worker information storage processing for memorizing a work table including, for each of a plurality of workers who are engaged in work of development or operation of a system, a period in which the worker possessed any one of a plurality of work attributes concerning to said work, a log storage processing for memorizing a work log recording, for each interaction among said plurality of workers, generation time of said interaction and said workers who participated in said interaction, and an evaluation processing for calculating from said work log and outputting relation strength, for each combination of said plurality of work attributes and said plurality of pairs of the workers, that indicates the strength of the relation between the workers composing the pair, based on number of times of said interactions within the pair that the workers composing the pair performed when having the work attribute. An evaluation method of one embodiment of the present invention comprises memorizing a work table including, for each of a plurality of workers who are engaged in work of development or operation of a system, a period in which the worker possessed any one of a plurality of work attributes concerning to said work, memorizing a work log recording, for each interaction among said plurality of workers, generation time of said interaction and said workers who participated in said interaction, and calculating from said work log and outputting relation strength, for each combination of said plurality of work attributes and said plurality of pairs of the workers, that indicates the strength of the relation between the workers composing the pair, based on number of times of said interactions within the pair that the workers composing the pair performed when having the work attribute.

The Effect of the Invention

The present invention enables to perform the development organization evaluation with the distinction of the attributes of development or management works by analyzing the log For example, while the division of work and vertical work-division system based on a role definition is clear in the waterfall type development, the correspondence of role definition and substantial role sharing is becoming ambiguous in agile development. For this reason, it becomes difficult to perform the management and analysis according to a conventional method. The present invention makes it easy to perform the management and the analysis of projects by analyzing log and clarifying the actual conditions of works.

BRIEF DESCRIPTION OF THE DRAWINGS

FIG. 11 is a figure which shows a matrix created by an evaluation unit 11.

EXEMPLARY EMBODIMENT

The First Embodiment

The exemplary embodiment for carrying out the present invention will be described in detail with reference to a drawing.

Figure 1:
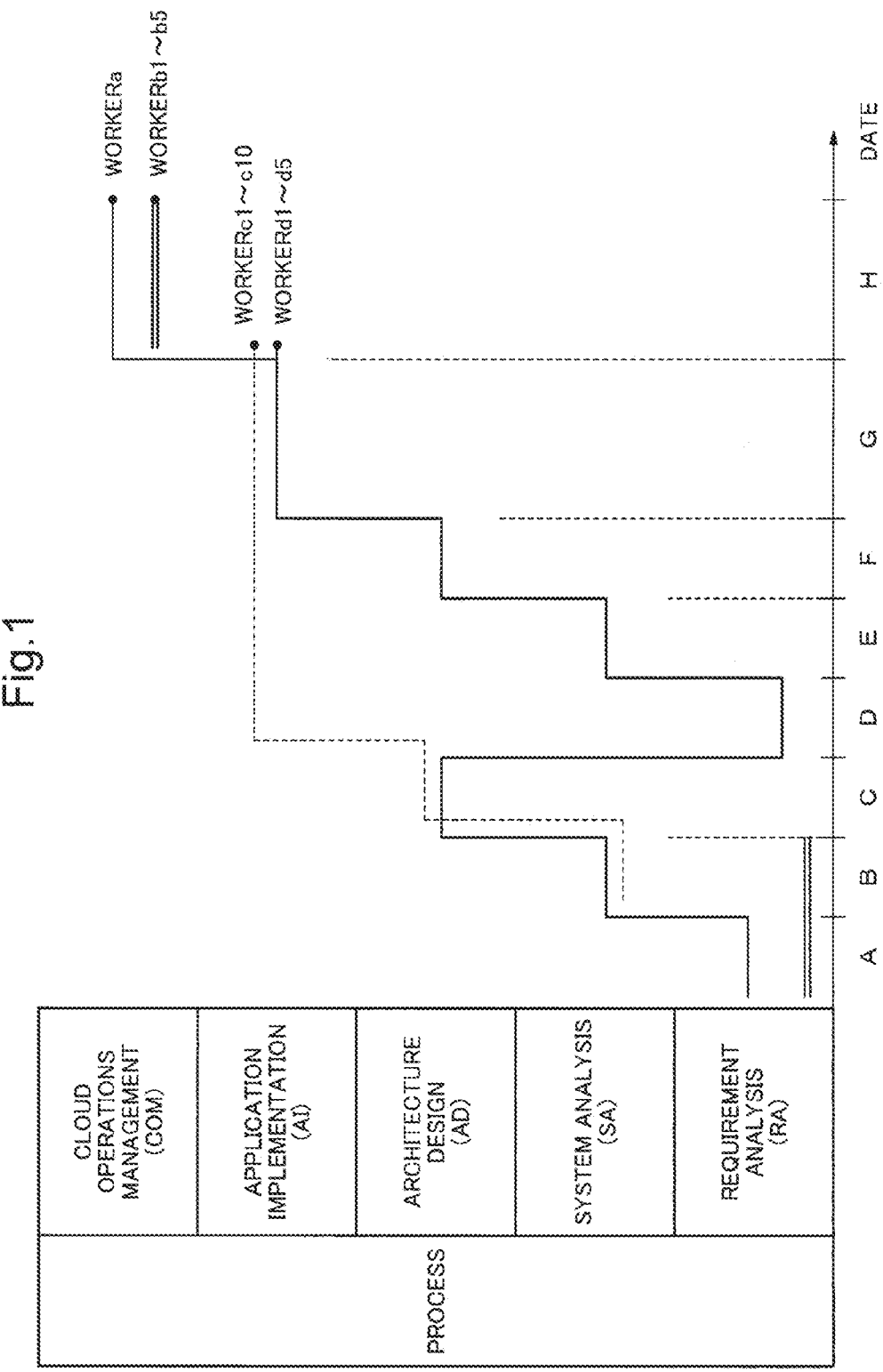
FIG. 1 is a figure which shows a relation of a worker and the development and operation process of software.

FIG. 1 is a figure which shows a relation of a worker and the development and operation process of software. Software is developed via a plurality of development processes, and is used for operations after that. Software is developed passing through successively each development process of a requirement analysis (RA), a system analysis (SA), an architecture design (AD) and an application implementation (AI), for example, and is used for the cloud operations management process (COM).

In software development, the modification of the developed program and the rework may be required. That is, the development work, in which a certain process once finished and the next process started, may return to the once finished process. For example, a requirement analysis process and a system analysis process are completed once, and a development work which is in the architecture design process after completing the requirement analysis process and the system analysis process may return to the requirement analysis process and the system analysis process. That may be caused by the change of the business condition of the customer. In particular, in agile development and the iteration development, this return of the development work often takes place.

Further, in the software development, all workers who are involved in the development may not work for the same process completely at the same time.

In an example of the development and operation project which FIG. 1 indicates, it is shown that a worker a returns to the request analysis in period D after being involved in the request analysis in period A, in the system analysis in period B and in the architecture design in period C. That is, the software development and operation project example in FIG. 1 has returned to the process which the development work has finished once between periods C and D.

After that, the worker a is involved in the systems analysis in period E, in the architecture design in period F, in the application implementation in period G and in the cloud operation management in period H.

After being involved in the request analysis in periods A and B, five people of workers b1 to b5 are involved in the cloud operation management in period H without being involved in this project in periods C to G. That is, the worker a and the worker b1 are engaged in the different processes in period B.

In a project example of FIG. 1, ten people of workers c1 to c10 participate in this project from the system analysis in period B, are involved in the architecture design in period C, in the application implementation in periods D to G and then leave this project. In periods A to G, five people of workers d1 to d5 are involved in the same process as worker a, and leave this project at the completion of period G.

Thus, the relation between a process and a worker is various. This tendency is remarkable in agile development and the iteration development.

Figure 2:
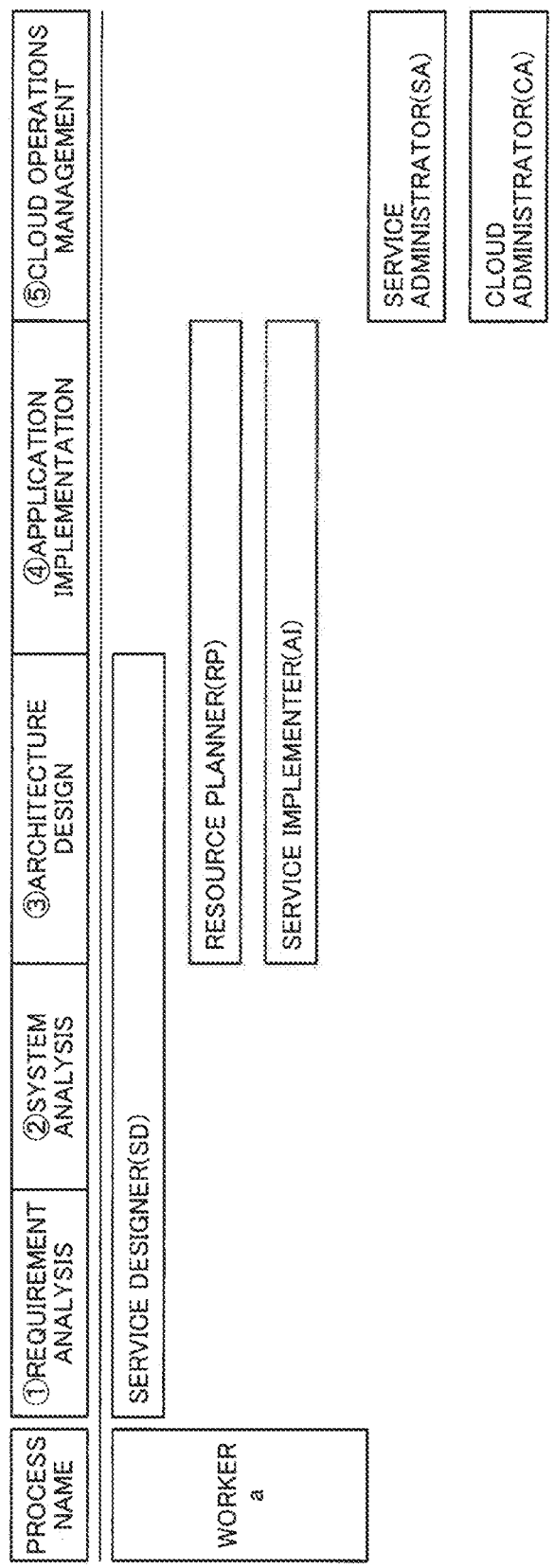
FIG. 2 is a figure which shows a relation between a worker and the role.

FIG. 2 is a figure which shows a relation between a worker and a role. A worker engaged in a software development project has the role to be achieved in the project. The role of one worker may change with the process. One worker may have a plurality of roles in one process. According to this embodiment, in order to describe simply, a role that is assigned to one worker is set to be one in a certain period.

In an example of FIG. 2, in the requirement analysis and the system analysis process, worker a has the role of a service designer (SD). This worker a has the three roles of a service designer, a resource planner (RP) and an application implementer (AI) in the architecture design process and two roles of a resource planner and application implementer in the application implementation process. This worker a has two roles of a service administrator (SA) and a cloud administrator (CA) in the cloud operations management process.

Further, the work that a worker who has each role has to do is defined in the operation standard note of the project.

Figure 3:
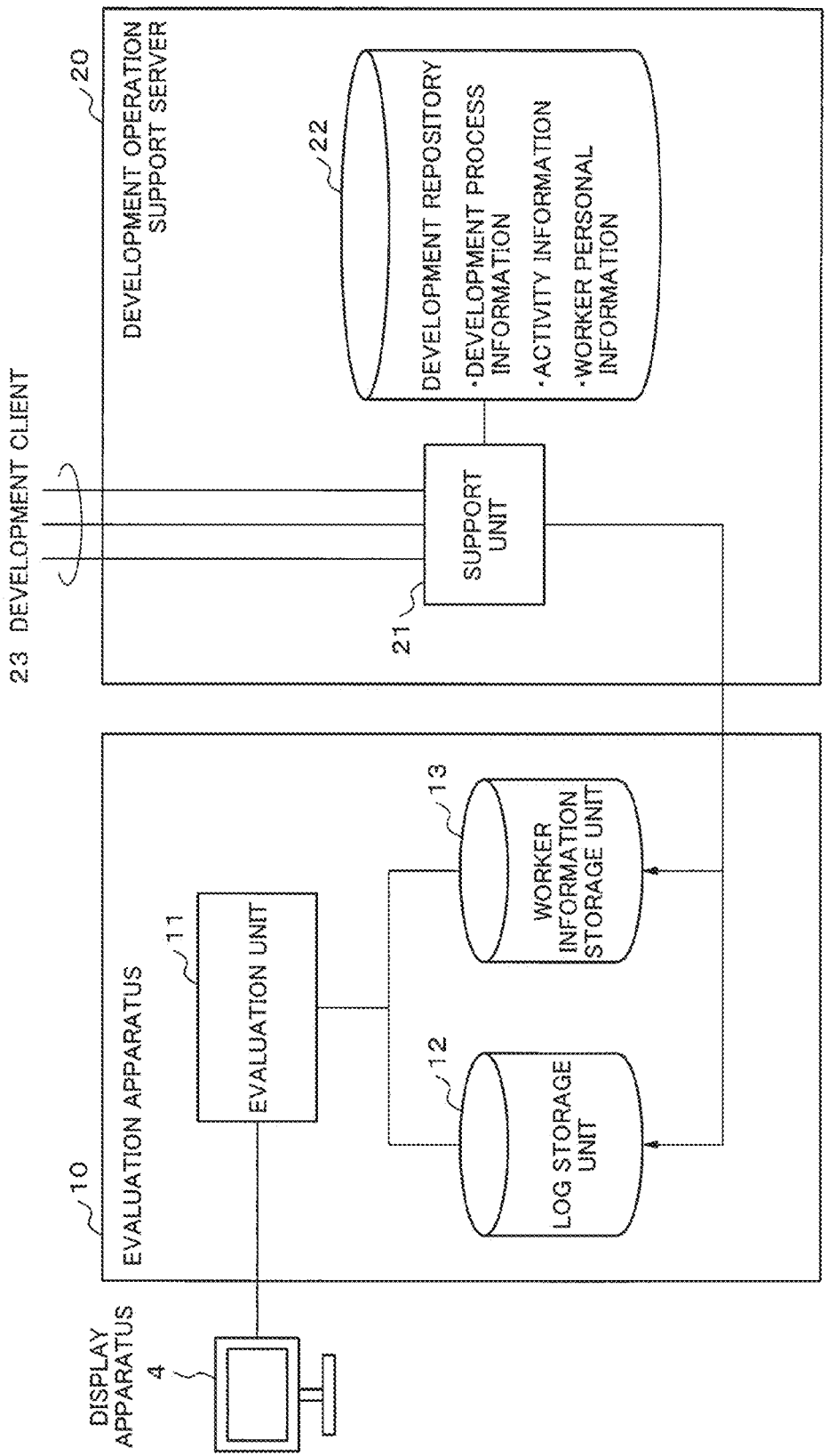
FIG. 3 is the whole configuration diagram of an evaluation system 30 according to the first embodiment.

FIG. 3 is the whole configuration diagram of the evaluation system 30 according to this embodiment. The evaluation system 30 includes the evaluation apparatus 10 and a development operation support server 20 connected to the evaluation apparatus 10 via a communication line or the like.

The evaluation apparatus 10 includes the evaluation unit 11, a log storage unit 12 and a worker information storage unit 13 which are logical circuits and storage apparatuses or the like. The evaluation unit 11 is connected to a display apparatus 14.

The evaluation apparatus 10 may be a computer which works under program control. In this case, the evaluation unit 11 may be realized by the processor provided in the computer to read and execute the program stored in the storage apparatus. The log storage unit 12 and the worker information storage unit 13 may be disk apparatus or the like provided in the computer.

For example, the development operation support server 20 is a server computer equipped with a CASE (Computer-added Software Engineering) tool. The development operation support server 20 includes a support unit 21 which execute a CASE tool, and a development repository 22 stores the information concerning to development. The support unit 21 is connected to a development client 23 with whom the worker participating in the development performs the development work.

The development repository 22 stores development process information, activity information, and worker personal information, in addition to programs under development and program parts which are available.

The development process information defines a development process as a flow which is combined with a plurality of activities. The activity information defines each activity work of which the development process is composed. Activity is registration of design specifications, review of specifications, approval and decline of specifications. Each activity has the role of the worker who carries out the activity as an attribute.

The worker personal information is a list of the worker who is related to the project. Each worker is assigned a role with the progress of the work process. The worker personal information may record the role that each worker has in a certain time or process. Further, here, the worker personal information may be a list of the worker team related to the project. In this case, the evaluation system 30 handles a work team as one unit.

The support unit 21 inputs an operation interaction of each worker from the development client 23, refers to the information stored in the development repository 22 and carries out the processing such as the creation and correction of a program under development. The support unit 21 generates the information to be stored in the log storage unit 12 and the worker information storage unit 13 of the evaluation apparatus 10 in the execution process of the processing. The generated information is inputted to the evaluation apparatus 10 via a communication line or a storage medium for data exchanging such as CD-ROM (Compact Disk-Read Only Memory).

Figure 4:
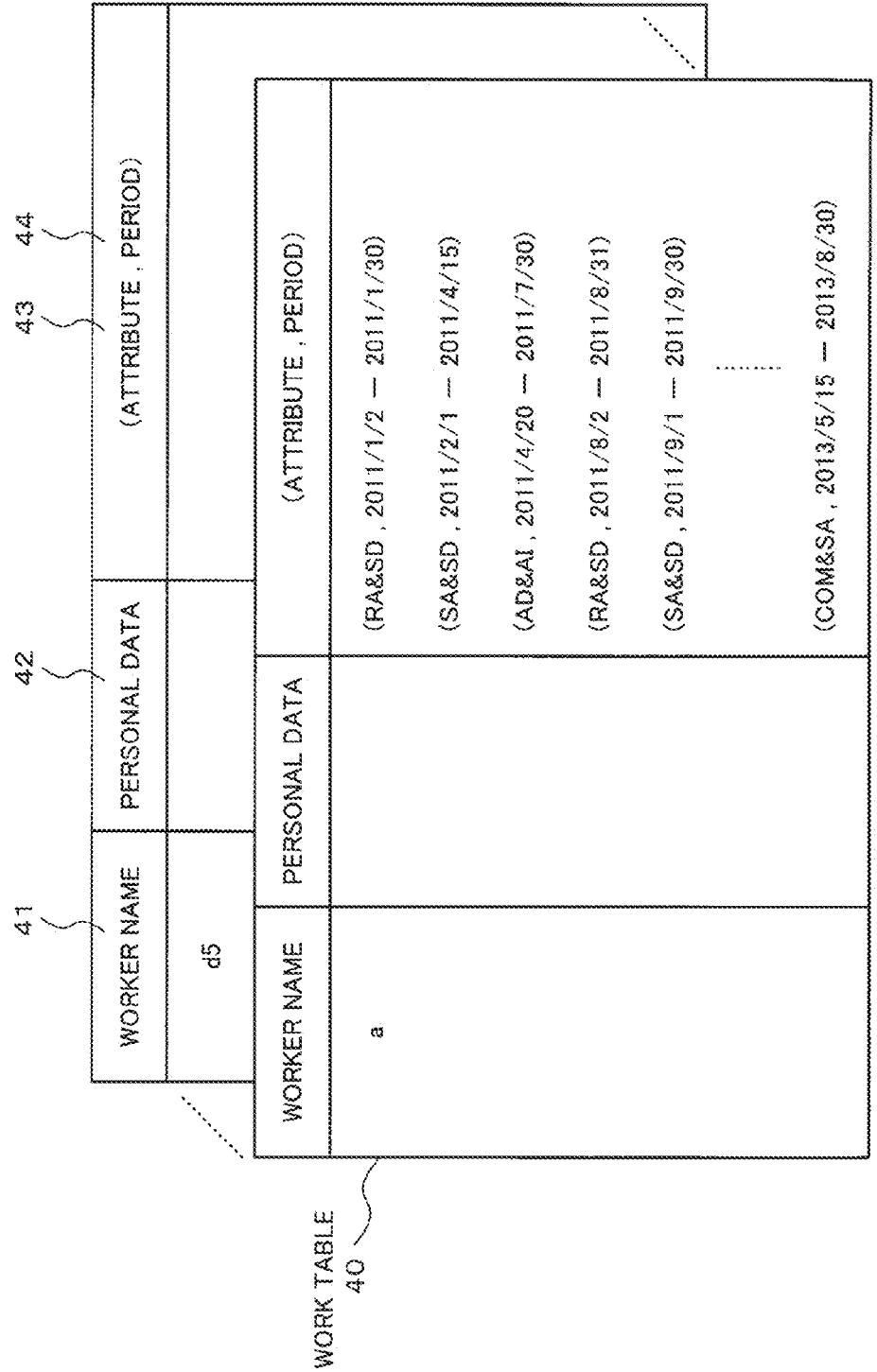
FIG. 4 is a figure which shows the composition of the work table 40 stored in a worker information storage unit 13.

FIG. 4 is a figure which shows the composition of the work table 40 stored in the worker information storage unit 13. The worker information storage unit 13 stores the work table 40 which is corresponding to each of a plurality of workers who are engaged in the work of development or operation of the program under development.

The work table 40 includes a worker name 41 and personal data 42. The worker name 41 is an identifier which specifies a worker such as a name and an employee number of the worker. The personal data 42 is the information concerning to an individual worker such as a background and a possessed skill of the worker.

Further, the work table 40 includes more than 1 pair of an attribute 43 and a period 44. This pair is the information that shows what kind of attribute 43 and when the worker in this work table 40 has possessed the attribute 43. For example, the period 44 includes a starting time and an ending time.

Here, for example, the attribute 44 is a development process which a worker has participated in. The attribute 44 may be the role that a worker has achieved. The attribute 44 may be combination of the development process which a worker has participated in and the role that the worker has achieved in the process. FIG. 4 indicates a data example when the attribute is combination of the process and the role.

The support unit 21 of the development operation support server 20 creates this pair whenever the attribute of the worker changes, for example. For example, when logging in to the development operation support server 20 from the development client 23, a worker inputs the process and the role which he takes charge of to a support unit 21. The support unit 21 detects the change of the inputted process and role and generates a pair of the attribute 43 and the period 44.

The first line A of FIG. 4 shows that a worker (henceforth, referred to as worker a) whose worker name 41 is "a" participated in a project from Jan. 2, 2011 to Jan. 30, 2011 with the role (with reference to FIG. 2) of SD in RA process (refer to FIG. 1). The second line of FIG. 4 shows that worker a participated in the project from Feb. 1, 2011 to Apr. 15, 2011 with the role of SD in a SA process.

Figure 5:
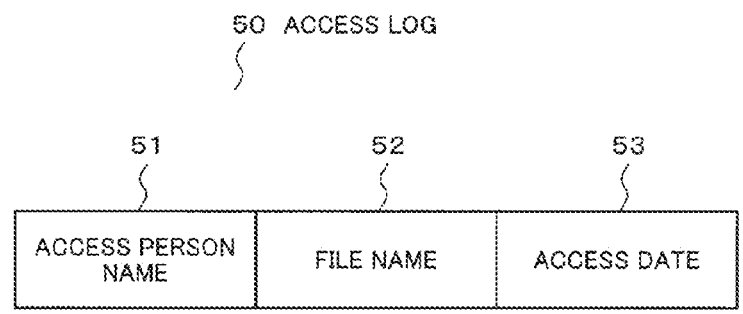
FIG. 5 is a figure which shows the composition of an access log 50 stored in a log storage unit 12.

FIG. 5 indicates the composition of the access log 50 stored in the log storage unit 12. Whenever detecting the access to a file, the support unit 21 of the development operation support server 20 generates the access log 50. The access log 50 includes an access person name 51, a file name 52 and an access date 53. The access person name 51 is the worker name 41 of the worker who has accessed the file. The file name 52 is an identifier of the accessed file. The access date 53 is the date and time that the access to the file takes place.

Figure 6:
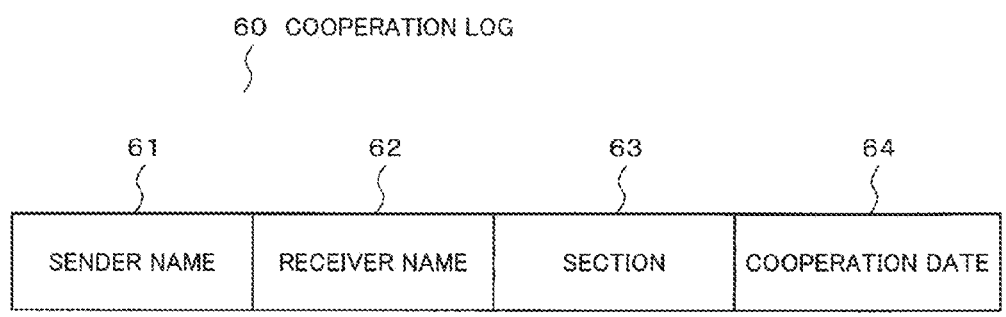
FIG. 6 is a figure which shows the composition of a cooperation log 60 stored in the log storage unit 12.

FIG. 6 indicates the composition of the cooperation log 60 stored in the log storage unit 12. Whenever detecting the request and the reply to the request between the workers, the support unit 21 of the development operation support server 20 generates the cooperation log 60.

The support unit 21 watches the mails between the workers and detects the request and the reply to the request between the workers, for example, from the title. The support unit 21 may detect the request and the reply to the request between the workers by detecting the command input for the request and response of work.

The cooperation log 60 includes a sender name 61, a receiver name 62, a section 63 and a cooperation date 64. The sender name 61 is a worker name 41 of a worker who has sent a request or a reply of cooperative work. A receiver name 62 is a worker name 41 of a worker who has received a request or a reply of the cooperative work.

The section 63 indicates the classification of opportunity in which cooperation log 60 has generated. For example, the section 63 is the information which classifies a work request, a work reply, an approval request and an approval reply. The section 63 may include other additional data. The cooperation date 64 is the date and time when the request or the reply of the cooperative work is sent or received between workers.

The log storage unit 12 may store only the access log 50, only the cooperation log 60 or both of them. When both of them are stored, the log storage unit 12 stores the access log 50 and the cooperation log 60 in different files or in the same file adding the discrimination information for both. The log storage unit 12 may store the other logs.

Figure 7:
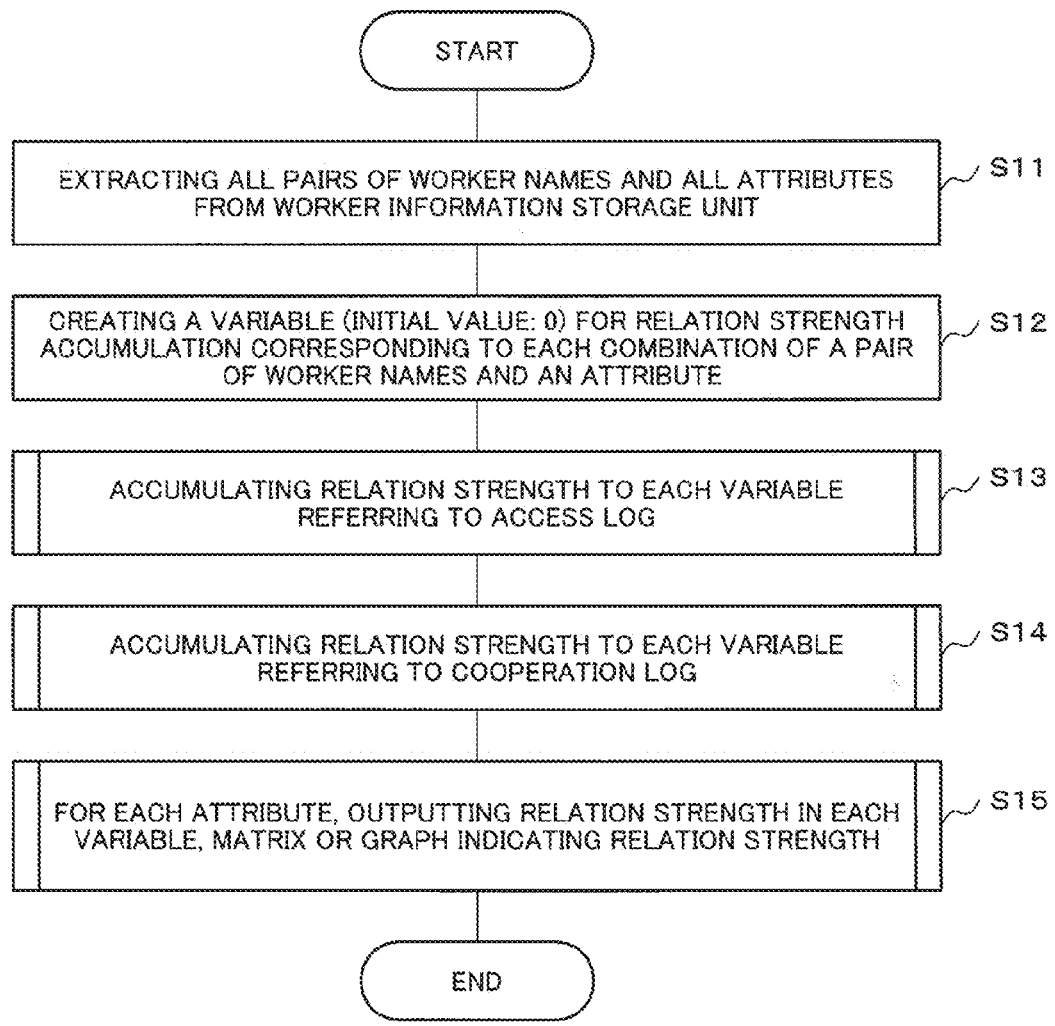
FIG. 7 is a rough operation flowchart of an evaluation unit 11 of an evaluation apparatus 10.

FIG. 7 is a rough operation flowchart of the evaluation unit 11 in the evaluation apparatus 10. The evaluation unit 11, referring to the work table 40, the access log 50 and the cooperation log 60, calculates and outputs, for each attribute, the relation strength that is an index of the interaction strength between the respective workers.

First, the evaluation unit 11 reads the entire work table 40 from the worker information storage unit 13 and extracts all pairs of worker names 41 and all of the attributes (S11). Next, the evaluation unit 11 creates a variable with an initial value 0 for the relation strength accumulation corresponding to each of all combinations of a pair of the worker names 41 and an attribute (S12).

Next, the evaluation unit 11 accumulates the relation strength in each variable with reference to the access log 50 (S13) and further accumulates the relation strength in each variable with reference to the cooperation log 60 (S14). The evaluation unit 11 may carry out only anyone of S13 and S14. The evaluation unit 11 may accumulate the relation strength in each variable, with reference to other logs in the log storage unit 12.

Finally, the evaluation unit 11 outputs the relation strength of each variable for each attribute (S15). The evaluation unit 11 may create a matrix or a graph which shows the relation strength, and outputs them.

Figure 8:
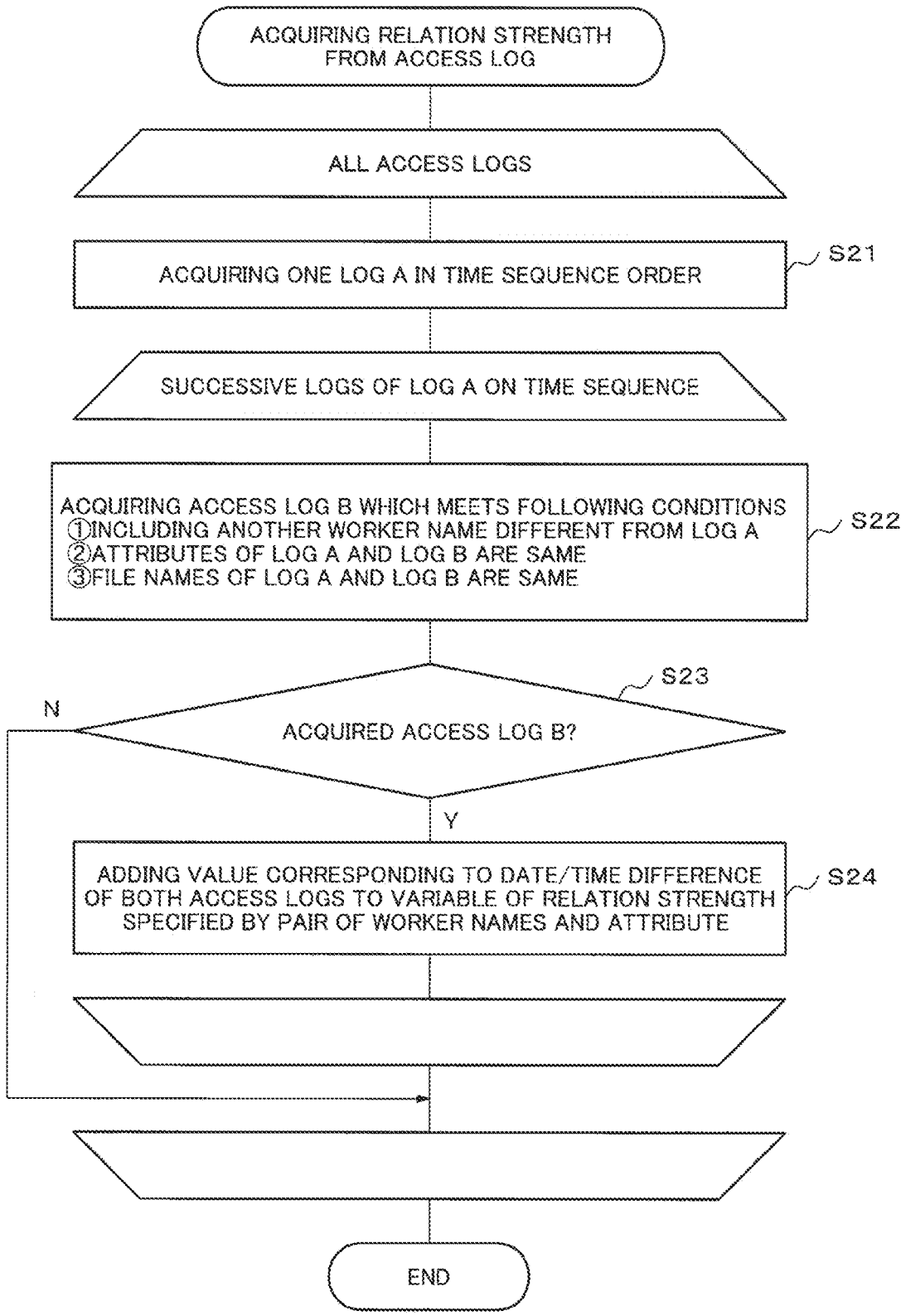
FIG. 8 is an operation flowchart of the processing that an evaluation unit 11 accumulates the relation strength with reference to an access log 50.
Figure 9:
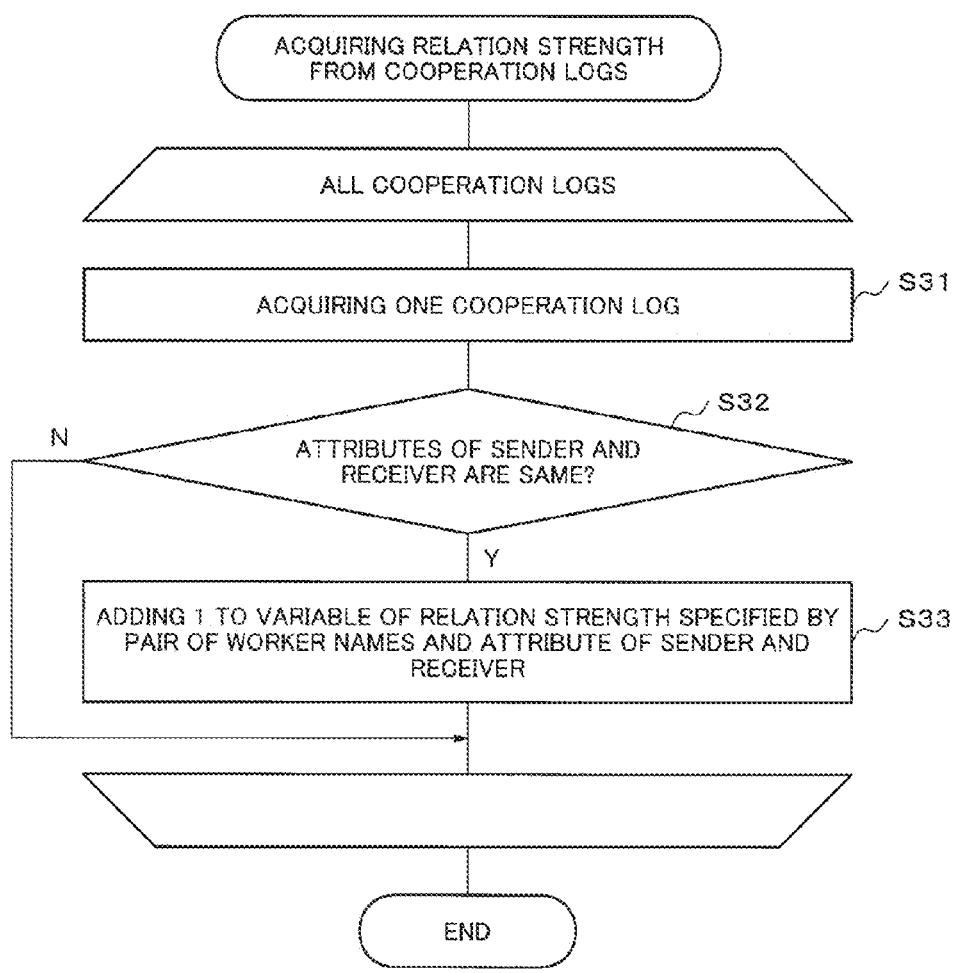
FIG. 9 is an operation flowchart of the processing that an evaluation unit 11 accumulates the relation strength with reference to a cooperative log 60.
Figure 10:
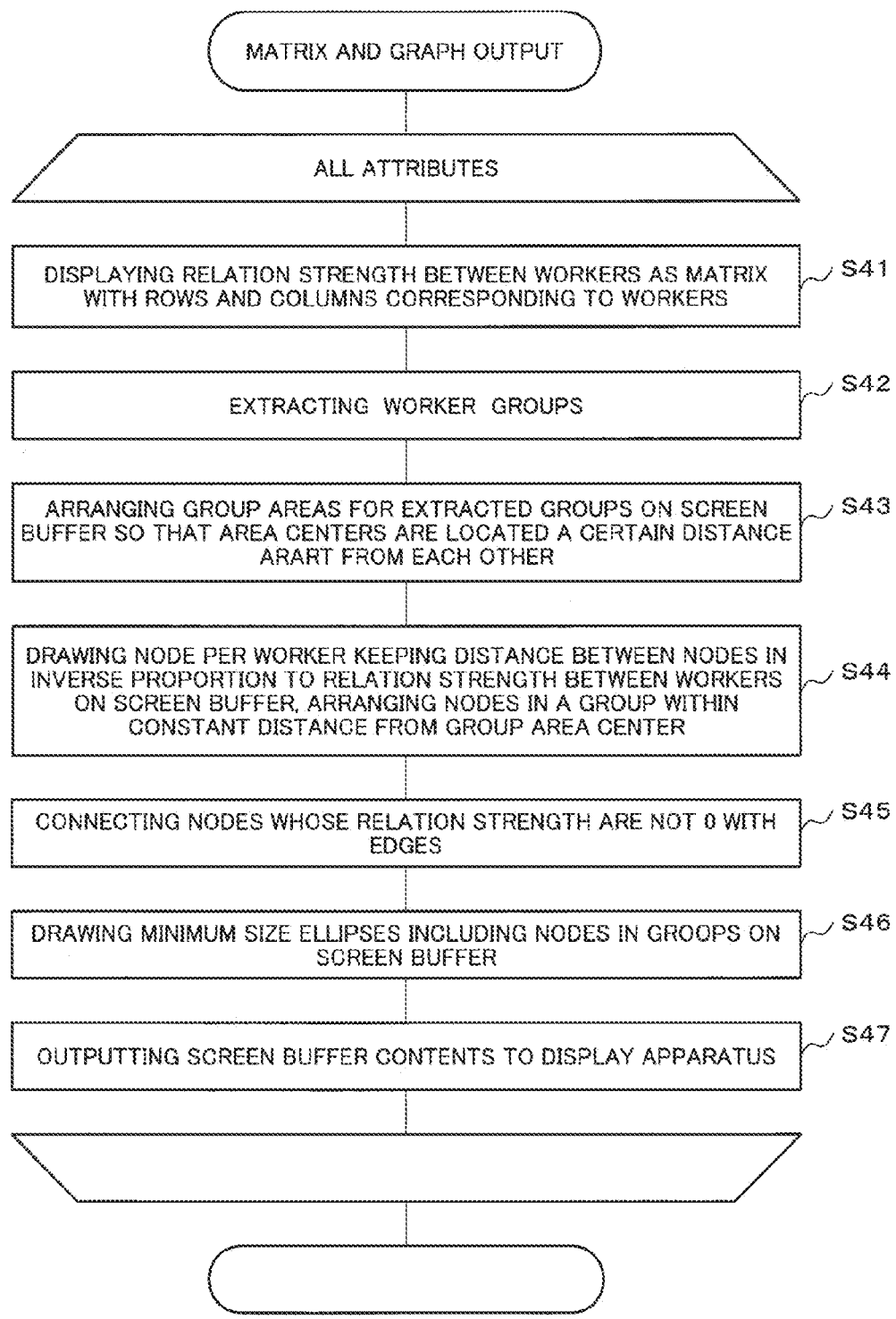
FIG. 10 is an operation flowchart of the processing that an evaluation unit 11 creates a matrix and a graph of the relation strength.

FIGS. 8, 9 and 10 indicate the details of processing of S13, S14 and S15 in FIG. 7.

FIG. 8 is an operation flowchart of the accumulation processing that the evaluation unit 11 accumulates the relation strength with reference to the access log 50. This operation flowchart indicates the processing details of S13 in FIG. 7.

The evaluation unit 11 executes the processing from S21 through S24 for all of the access logs 50. First, the evaluation unit 11 selects one log in the time series order based on the access date 53 (S21). The log selected here is referred as log A hereinafter.

Next, the evaluation unit 11 executes the processing from S22 through S24 for all of the succeeding access logs on the time series of log A. Then evaluation unit 11 selects one log which meets the following three conditions out of the succeeding logs on the time series of log A based on the access date 53 (S22). The log selected here is referred as log B, hereinafter.

The first condition is that the log B includes the access person name 51 which are different from the log A. That is, the first condition is that the access person name 51 of the log A is different from the access person name 51 of the log B.

The second condition is that the attribute 43 of the log A and the attribute 43 of the log B are same. The evaluation unit 11 obtains the worker's attribute 43 of the access log 50 by searching for the period 44 including the access date 53 from the work table 40 where an access person name 51 and a worker name 41 are identical.

The third condition is that the file name 52 of the log A and the file name 52 of the log B are same.

When it acquires the log B (Y in S23), the evaluation unit 11 adds the value according to the difference in the access dates 53 of the both the access log A and the access log B to the relation strength variable, which is specified with the pair of the access person names 51 and the attributes 43 of the both logs 50 (S24). The evaluation unit 11 adds the value that indicates higher relation strength when the difference between the access date 53 of the log A and the access date 53 of the log B is smaller. For example, the evaluation unit 11 adds 1, when the difference in the access date 53 of both of the access logs 50 is smaller than the predetermined value T, and it adds 1.5, when the difference is not smaller than the predetermined value T.

Further, a value that indicates high relation strength is not always needed to be a large value. The evaluation unit 11 may indicate higher relation strength when the value is smaller. In this case, for example, the evaluation unit 11 adds 1 when the difference in the access date 53 of both of the access logs 50 is smaller than the predetermined value T, and adds 1.5 when it is not smaller than the predetermined value T.

The evaluation unit 11 may set the relation strength to 0 between the accesses which have occurred separately in the interval longer than the predetermined time. The evaluation unit 11 may simply count the number of times that each worker has accessed to the same file and may find the relation strength among the respective workers based on that number of times.

When the evaluation unit 11 does not acquire the log B (N in S23), it returns to S21 without adding the variable of the relation strength.

FIG. 9 is an operation flowchart of the processing in which the evaluation unit 11 accumulates the relation strength with reference to the cooperation log 60. This operation flowchart indicates the details of the processing of S14 in FIG. 7.

The evaluation unit 11 executes the processing from S31 through S33 for all of the cooperation logs 60. First, the evaluation unit 11 acquires one of the cooperation logs 60 (S31), and determines whether the attributes 43 of the sender and the receiver concerning to the cooperation logs 60 are same or not (S32). The evaluation unit 11 obtains the attribute 43 of the sender by searching for the period 44 including the cooperation date 64 from the work table 40 in which the sender name 61 and the worker name 41 are identical. The evaluation unit 11 also gets the attribute 43 of the receiver from the receiver name 62 similarly.

When the attributes 43 of the sender and the receiver are same (Y in S32), the evaluation unit 11 adds 1 to the relation strength variable which is specified by the pair of the sender name 61 and the receiver name 62 and the same attribute 43 of the sender and the receiver (S33). When the attributes 43 of the sender and the receiver are not same (N in S32), the evaluation unit 11 adds none to the variable of the relation strength, and returns to S31.

Figure 12:
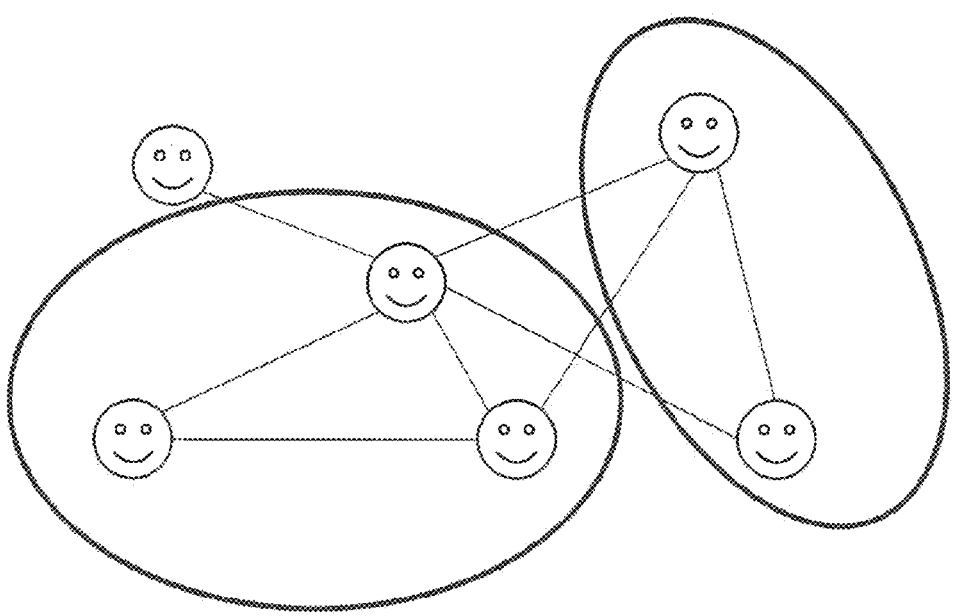
FIG. 12 is a figure which shows a graph created by an evaluation unit 11.

FIG. 10 is an operation flowchart of the processing that the evaluation unit 11 creates a matrix and a graph of the relation strength. This operation flowchart indicates the details of the case that a matrix and a graph are created in the processing of S15 in FIG. 7. FIG. 11 indicates a matrix which the evaluation unit 11 creates. FIG. 12 indicates a graph which the evaluation unit 11 creates.

The evaluation unit 11 executes the processing from S41 through S47 for all kinds of attributes 43. First, the evaluation unit 11 displays the relation strength between the workers as a matrix that has rows and columns corresponding to the workers, where the relation strength between one worker who is corresponding to the row and another worker who is corresponding to the column is displayed at the intersection point of the row and the column (S41). That is, the evaluation unit 11 displays the relation strength of each variable corresponding to the attribute by the shape of the matrix which FIG. 11 (a) shows. Further, the evaluation unit 11 normalizes the relation strength so that its maximum value will be 1, and does not indicate the value when the relation strength is 0 in FIG. 11 (a).

According to the data example in the first line of FIG. 11 (a), while worker a has a relation of the relation strength 0.4 with the worker b1, it has no relation with the other workers. Here, that there is no relation between two workers means that the variable for the relation strength accumulation corresponding to the pair of the workers contains the initial value 0 when S12 and S13 of FIG. 4 are completed.

According to a data example in the second line of FIG. 11 (a), while the worker b1 has a relation of the relation strength 0.4 with the worker a, a relation of the relation strength 1.0 with the workers b2 and b3, and a relation of the relation strength 0.6 with the workers b4 and b5, there is no relation with other workers.

Next, in FIG. 10, the evaluation unit 11 extracts clusters of workers, that is, groups (S42). Here, the evaluation unit 11 forms the clusters of workers, exchanging the positions of the rows and the columns of the matrix. The evaluation unit 11 extracts groups so that the sums of the relation strength of the workers, who are arranged close to the diagonal line of the matrix, thus compose the clusters, become larger.

The evaluation unit 11 uses, for example, a genetic algorithm to extract groups along a diagonal line exchanging the positions of the rows and the columns of the matrix in FIG. 11 (a) so that the total sums of the relation strengths of the workers who compose the groups shall be largest. Here, the evaluation unit 11 can employ the technology used in DSM (Design Structure Matrix) or the like. FIG. 11 (b) indicates the matrix after exchanging the rows and the columns of the matrix in FIG. 11 (a).

Further, corresponding to the total sum of the relation strengths in the cluster, the evaluation unit 11 may classify the cluster by color to increase the visibility on the matrix of FIG. 11 (b).

Next, the evaluation unit 11 arranges the centers of the areas for groups, which are extracted, on the screen buffer so that they are located a certain fixed distance apart from each other. (S43).

For each worker, the evaluation unit 11 draws a node keeping distance between the nodes proportional to a reciprocal of the relation strength between the respective workers on the screen buffer (S44). At that time, the evaluation unit 11 arranges the nodes in the same group within a fixed distance from the center of the area of the group.

The evaluation unit 11 connects the nodes of the workers whose relation strengths are not 0 with edges (S45), draws for each group the smallest ellipse including the nodes in the group in a screen buffer (S46) and outputs the screen buffer to the display apparatus 14 (S47). FIG. 12 indicates a graph displayed on the display apparatus 14.

Further, the evaluation unit 11 may display only either one of a matrix or a graph. In the case that only the graph is displayed, the evaluation unit 11 may extract the group independent from the matrix. For example, the evaluation unit 11 extracts a group so that the relation strength between the workers who compose the group will be not smaller than the predetermined value. In addition, the evaluation unit 11 does not have to perform the extraction and display of the groups.

The evaluation apparatus 10 according to this embodiment enables to perform development organization evaluation by analyzing the logs according to the attitudes 43 of work of development or operation such as the work process or the role. This development organization evaluation also becomes possible for agile development and the iteration development. The reason is because the evaluation unit 11 calculates and displays the relation strength between the workers based on the number of times of the interactions between the workers and the weight of each interaction for each attribute based on the work table 40.

For example, the evaluation apparatus 10 outputs the relation strength between the workers according to the worker's role in a development process. As a result, an administrator or the like of a development project can find a worker who has a leadership or know-how regarding various roles.

The evaluation equipment 10 outputs the relation strength between the workers according to the work processes in the development process. As a result, an administrator or the like of a development project can find a key person (proxy and mediator) who manages various work processes.

Because an administrator or the like can grasp an engineer which has skills for each process or role, in one development team, it can combine an engineer with a plurality of skills and an engineer with a specific skill and perform proper arrangement of human resources.

In addition, the evaluation apparatus 10 displays the matrix (FIG. 11) or the graph display (FIG. 12) of the relation strength, and visualizes the relation between the clusters of the workers. This cluster is based on the interactions of the workers. As a result, it becomes easy for the administrator or the like of a development project to know the group existence based on the relation strength and the relation between them, and becomes possible to judge the appropriateness of the group composition of the development or the operations.

That is, the administrator or the like can specify the group composition which is easy to accumulate the know-how and grasp the group independency. In addition, the administrator or the like can divide a group so that a parallel development may be achieved. As a result, the administrator or the like can reconsider the organization design or reconsider the work process which enables the parallel development.

The Second Embodiment

The evaluation apparatus 10 according to the second embodiment of the present invention accumulates the relation strength per work process from the cooperation log 60. In that case, when the roles of the sender and the receiver are same, the evaluation apparatus 10 adds a value larger than when their roles are different.

Hereinafter, this embodiment will be described in detail with reference to a drawing. The difference from the first embodiment will be described.

In this embodiment, the attribute 44 in the work table 40 is a combination of a development process in which a worker has participated and the role that a worker has played in the process. In S12 of FIG. 7, the evaluation unit 11 creates a variable for the relation strength accumulation with an initial value 0 for each of all combinations of a pair of worker names 41 and a progress. That is, the variable for the relation strength accumulation exists not for each of all combinations for a pair of worker names 41 and an attribute, but for each of all combinations for a pair of worker names 41 and a progress.

Figure 13:
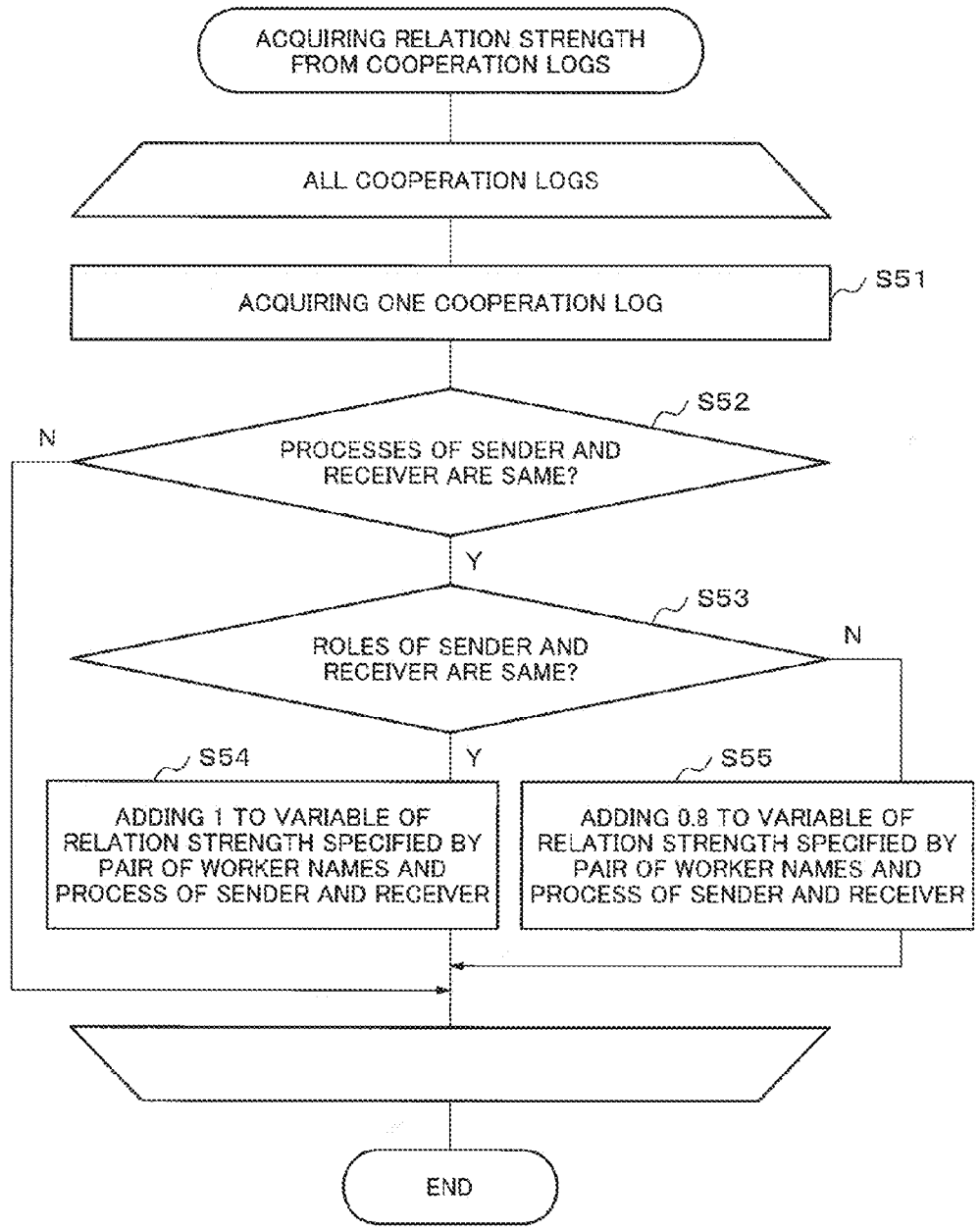
FIG. 13 is an operation flowchart of the processing that an evaluation unit 11 accumulates the relation strength with reference to cooperation log 60 according to the second embodiment.

In the second embodiment, FIG. 13 is an operation flowchart of the processing that the evaluation unit 11 is accumulating the relation strength with reference to the cooperation log 60. FIG. 13 substitutes FIG. 9 in the first embodiment.

In this embodiment, the evaluation unit 11 executing the processing from S51 through S55 for all of the cooperation logs 60. First, the evaluation unit 11 acquires one cooperation log 60 (S51), and determines whether the processes in the attributes 43, of the sender and the receiver in that cooperation log 60, are same or not (S52). The evaluation unit 11 obtains the sender process by searching for a period 44 including the cooperation date 64 from the work table 40 in which the sender name 61 and the worker name 41 are same. The evaluation unit 11 also gets the attribute 43 of the receiver from the receiver name 62 similarly.

When the processes of a sender and a receiver are same (Y in S52), the evaluation unit 11 determines whether the roles in the attributes 43 of the sender and the receiver concerning to the cooperation log 60 are same (S53).

When the roles of the sender and the receiver are same (Y in S53), the evaluation unit 11 adds 1 to the variable of the relation strength that is specified by the pair of the sender and the receiver and the processes which are same (S54). When the roles of the sender and the receiver are not same (N in S53), the evaluation unit 11 adds value 0.8 which is smaller than 1 to the variable of the relation strength that is specified by a pair of a sender and a receiver and the processes which are same (S55). Further, the added value 1 or 0.8 may be set to the evaluation apparatus 10 as a parameter, and may be changed appropriately by an operator of the evaluation apparatus 10. In case of the roles of the sender and the receiver are not same, the added value may be changed according to the combination of the roles of the sender and the receiver.

When the processes of the sender and the receiver are not same (N in S52), the evaluation unit 11 returns to S51 without adding anything to the variable of the relation strength.

Further, in this embodiment, the evaluation unit 11 may reverse the roles of the process and the role.

When calculating the relation strength for each process (or role), the evaluation apparatus 10 according to this embodiment reflects the difference of the roles (or process) of both workers who have carried out an interaction in the relation strength. On addition, an operator of the evaluation apparatus 10 can change the reflection degree. The reason is because the evaluation unit 11 judges the difference of the roles (or processes) of both workers who have carried out an interaction, and changes the added value to the variable of the relation strength.

As a result, when finding a worker with a leadership or know-how for each process, for example, an administrator or the like of a development project can suppress influence of the interaction which causes the noise by evaluating the interaction within the same role heavily.

The Third Embodiment

Figure 14:
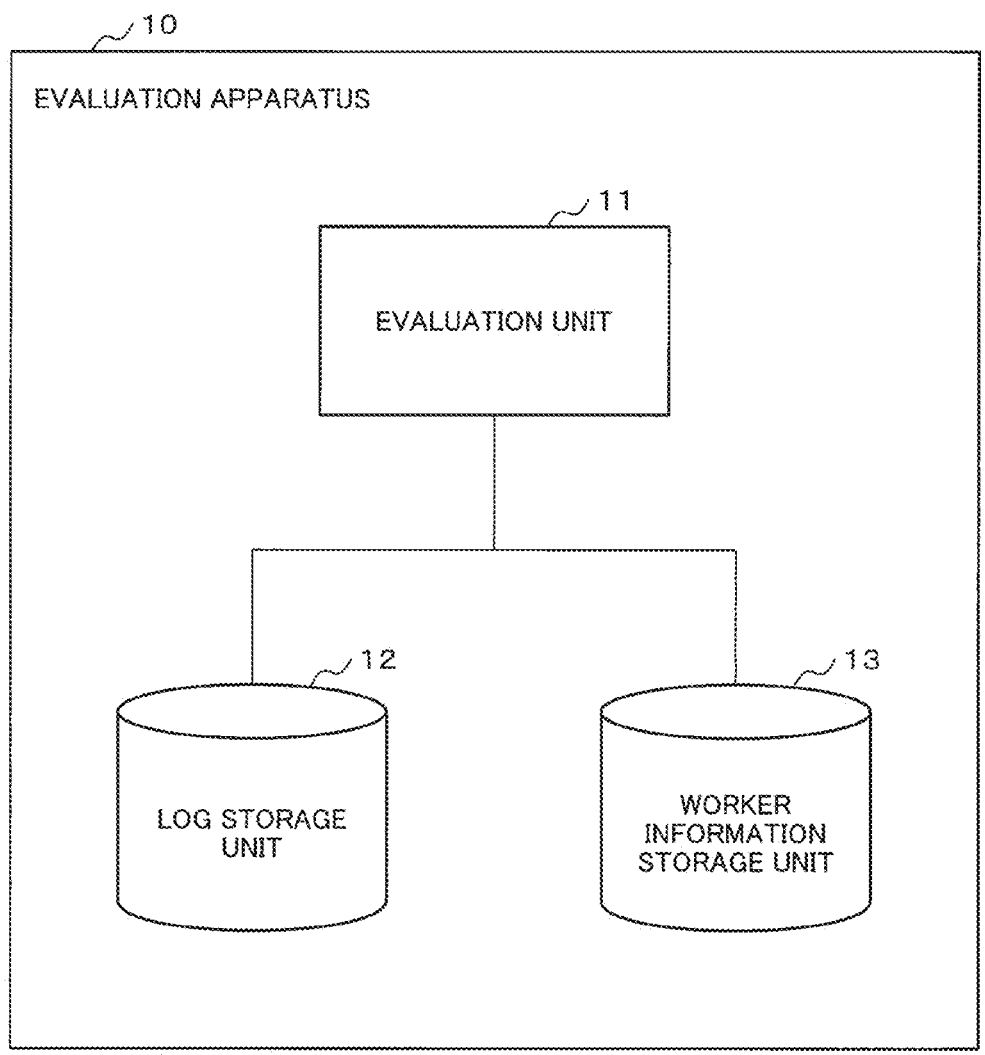
FIG. 14 is a configuration diagram of the evaluation apparatus 10 according to the third embodiment.

FIG. 14 is a configuration diagram of an evaluation apparatus 10 according to the third embodiment.

The evaluation equipment 10 of this embodiment includes an evaluation unit 11, a log storage unit 12 and a worker information storage unit 13.

The worker information storage unit 13 stores a work table 40 including, for each of a plurality of workers who are engaged in work of development or operation of a system, a period 44 in which the worker possessed any one of a plurality of work attributes 43 concerning to the work.

The log storage unit 12 stores a work log recording, for each interaction among the plurality of workers, generation time of the interaction and the workers who participated in the interaction. For example, the work log is the access log 50 or the cooperation log 60.

From the work log, the evaluation unit 11 calculates from the work log and outputs relation strength, for each combination of the plurality of work attributes 43 and the plurality of pairs of the workers, that indicates the strength of the relation between the workers composing the pair, based on number of times of the interactions within the pair that the workers composing the pair performed when having the work attribute 43

The evaluation apparatus 10 according to this embodiment enables to perform the development organization evaluation by analyzing the logs according to the attributes 43 of the development and the operation work such as the work process of the role. This development organization evaluation also becomes possible for agile development and the iteration development. The reason is because the evaluation unit 11 calculates and displays the relation strength among the workers based on the number of times of the interactions among the workers and the weight of each interaction for each attribute based on the work table 40.

Although the present invention has been described above with reference to the embodiment (and example forms), the present invention is not limited to the embodiment (and example forms) mentioned above. The various modifications which a person skilled in the art can understand in the scope of the present invention are possible in the composition of the present invention and its details.

This application insists on priority based on Japanese application Japanese Patent Application No. 2012-007855 proposed on Jan. 18, 2012 and takes all of the disclosure here.

A DESCRIPTION OF THE CODES

10 Evaluation apparatus.
11 Evaluation unit.
12 Log storage unit.
13 Worker information storage unit.
14 Display apparatus.
20 Development operation support server.
21 Support unit.
22 Development repository.
23 Development client.
40 Work table.
41 Worker name.
42 Personal data.
43 Attribute.
44 Period.
50 Access log.
51 Access person name.
52 File name.
53 Access date.
60 Cooperation log.
61 Sender name.
62 Receiver name.
63 Section.
64 Cooperation date.

The invention claimed is:

1. An evaluation apparatus includes a processor, the evaluation apparatus comprising:
   a worker information storage unit which stores a work table including, for each of a plurality of workers who are engaged in work of development or operation of a system, a period in which the worker possessed any one of a plurality of work attributes concerning to said work,
   a log storage unit which stores a work log recording, for each interaction among said plurality of workers, generation time of said interaction and said workers who participated in said interaction, and
   an evaluation unit which calculates from said work log and outputs relation strength, for each combination of said plurality of work attributes and said plurality of pairs of the workers, that indicates the strength of the relation between the workers composing the pair, based on number of times of said interactions within the pair that the workers composing the pair performed when having the work attribute.

2. The evaluation apparatus according to claim 1, wherein, said evaluation unit outputs the relation strength between the workers who composes the pair as a matrix having the rows and columns corresponding to said plurality of workers.

3. The evaluation apparatus according to claim 2, wherein, said evaluation unit extracts from said plurality of workers in a group of workers based on a total sum of said relation strength among the group of workers,
   creates and outputs a graph in which each node represents each of said plurality of workers, each edge between the nodes represents said relation strength, and said nodes in said group are closely arranged each other.

4. The evaluation apparatus according claim 1, wherein, said worker information storage unit stores said work table which includes, for at least one of said workers, said periods having a first of said plurality of work attributes before and after on the time sequence said period having a second of said plurality of work attributes.

5. The evaluation apparatus according to claim 1, wherein said plurality of work attributes are either one of,
   a plurality of processes concerning to the development or operation of the system that each of said plurality of workers is engaged in,
   a plurality of roles concerning to the development or operation of the system that each of said plurality of workers is engaged in, or
   a combination of said plurality of processes concerning to the development or operation of the system that each of said plurality of workers is engaged in, and said plurality of roles concerning to the development or operation of the system that each of said a plurality of workers is engaged in each of said plurality of processes.

6. The evaluation apparatus according to claim 1, wherein said plurality of work attributes is a combination of said plurality of processes concerning to the development or operation of the system that each of said plurality of workers is engaged in, and said plurality of roles concerning to the development or operation of the system that each of said a plurality of workers is engaged in each of said plurality of processes,
   one of said process and said role is a first attribute and another is a second attribute, and
   said evaluation unit calculates the higher relation strength, from the number of times of said interactions within the pair that the workers composing the pair performed when having the first attribute as said work attribute, for each of said plurality of the first attributes and the pair of said plurality of workers when said second attributes of the workers who compose said pair are same than when said second attributes are different.

7. The evaluation apparatus according to claim 1, wherein said work log includes an access log to a file by said worker, and
   said evaluation unit calculates weight, when detecting from said work log successive accesses to the same file by different workers composing said pair, that increases according to the time wise proximity of both accesses, and calculates said relation strength by accumulating said weight.

8. The evaluation apparatus according to claim 1, wherein, said work log includes a cooperation log of a request and reply between the workers, and
   said evaluation unit calculates said relation strength from said cooperation logs by counting the number of said cooperation logs between the workers who compose said pair.

9. A non-transitory computer-readable recording medium which stores an evaluation program which makes a computer execute:
   a worker information storage processing for memorizing a work table including, for each of a plurality of workers who are engaged in work of development or operation of a system, a period in which the worker possessed any one of a plurality of work attributes concerning to said work,
   a log storage processing for memorizing a work log recording, for each interaction among said plurality of workers, generation time of said interaction and said workers who participated in said interaction, and
   an evaluation processing for calculating from said work log and outputting relation strength, for each combination of said plurality of work attributes and said plurality of pairs of the workers, that indicates the strength of the relation between the workers composing the pair, based on number of times of said interactions within the pair that the workers composing the pair performed when having the work attribute.

10. The non-transitory computer-readable recording medium according to claim 9 which stores the evaluation program, which makes a computer execute said evaluation processing for outputting the relation strength between the workers who composes the pair as a matrix having the rows and columns corresponding to said plurality of workers.

11. The non-transitory computer-readable recording medium according to claim 10 which stores the evaluation program, which makes a computer execute,
   said evaluation processing for extracting from said plurality of workers in a group of workers based on a total sum of said relation strength among the group of workers,
   creating and outputting a graph in which each node represents each of said plurality of workers, each edge between the nodes represents said relation strength, and said nodes in said group are closely arranged each other.

12. The non-transitory computer-readable recording medium according to claim 9 which stores the evaluation program, which makes a computer execute, said worker information storage processing for memorizing said work table which includes, for at least one of said workers, said periods having a first of said plurality of work attributes before and after on the time sequence said period having a second of said plurality of work attributes.

13. The non-transitory computer-readable recording medium according to claim 9 which stores the evaluation program, wherein said plurality of work attributes are either one of,
- a plurality of processes concerning to the development or operation of the system that each of said plurality of workers is engaged in,
- a plurality of roles concerning to the development or operation of the system that each of said plurality of workers is engaged in, or
- a combination of said plurality of processes concerning to the development or operation of the system that each of said plurality of workers is engaged in, and said plurality of roles concerning to the development or operation of the system that each of said a plurality of workers is engaged in each of said plurality of processes.

14. The non-transitory computer-readable recording medium according to claim 9 which stores the evaluation program, wherein
- said plurality of work attributes is a combination of said plurality of processes concerning to the development or operation of the system that each of said plurality of workers is engaged in, and said plurality of roles concerning to the development or operation of the system that each of said a plurality of workers is engaged in each of said plurality of processes,
- one of said process and said role is a first attribute and another is a second attribute, and
- said evaluation processing is for calculating the higher relation strength, from the number of times of said interactions within the pair that the workers composing the pair performed when having the first attribute as said work attribute, for each of said plurality of the first attributes and the pair of said plurality of workers when said second attributes of the workers who compose said pair are same than when said second attributes are different.

15. The non-transitory computer-readable recording medium according to claim 9 which stores the evaluation program, wherein
- said work log includes an access log to a file by said worker, and
- said evaluation processing is for calculating weight, when detecting from said work log successive accesses to the same file by different workers composing said pair, which increases according to the time wise proximity of both accesses, and calculating said relation strength by accumulating said weight.

16. The non-transitory computer-readable recording medium according to claim 9 which stores the evaluation program, wherein,
- said work log includes a cooperation log of a request and reply between the workers, and
- said evaluation processing is for calculating said relation strength from said cooperation logs by counting the number of said cooperation logs between the workers who compose said pair.

17. A processor-executed evaluation method comprising:
- storing a work table including, for each of a plurality of workers who are engaged in work of development or operation of a system, a period in which the worker possessed any one of a plurality of work attributes concerning to said work,
- storing a work log recording, for each interaction among said plurality of workers, generation time of said interaction and said workers who participated in said interaction, and
- calculating from said work log and outputting relation strength, for each combination of said plurality of work attributes and said plurality of pairs of the workers, that indicates the strength of the relation between the workers composing the pair, based on number of times of said interactions within the pair that the workers composing the pair performed when having the work attribute.

18. The processor-executed evaluation method according to claim 17, wherein, outputting the relation strength between the workers who composes the pair as a matrix having the rows and columns corresponding to said plurality of workers.

19. The processor-executed evaluation method according to claim 18, wherein,
- extracting from said plurality of workers in a group of workers based on a total sum of said relation strength among the group of workers,
- creating and outputting a graph in which each node represents each of said plurality of workers, each edge between the nodes represents said relation strength, and said nodes in said group are closely arranged each other.

20. The processor-executed evaluation method according to claim 17, wherein,
- storing said work table which includes, for at least one of said workers, said periods having a first of said plurality of work attributes before and after on the time sequence said period having a second of said plurality of work attributes.

21. The processor-executed evaluation method according to claim 17, wherein said plurality of work attributes are either one of,
- a plurality of processes concerning to the development or operation of the system that each of said plurality of workers is engaged in,
- a plurality of roles concerning to the development or operation of the system that each of said plurality of workers is engaged in, or
- a combination of said plurality of processes concerning to the development or operation of the system that each of said plurality of workers is engaged in, and said plurality of roles concerning to the development or operation of the system that each of said a plurality of workers is engaged in each of said plurality of processes.

22. The processor-executed evaluation method according to claims 17, wherein
- said plurality of work attributes is a combination of said plurality of processes concerning to the development or operation of the system that each of said plurality of workers is engaged in, and said plurality of roles concerning to the development or operation of the system that each of said a plurality of workers is engaged in each of said plurality of processes,
- one of said process and said role is a first attribute and another is a second attribute, and
- calculating the higher relation strength, from the number of times of said interactions within the pair that the workers composing the pair performed when having the first attribute as said work attribute, for each of said plurality of the first attributes and the pair of said plurality of workers when said second attributes of the workers who compose said pair are same than when said second attributes are different.

23. The processor-executed evaluation method according to claims 17, wherein
- said work log includes an access log to a file by said worker, and
- calculating weight, when detecting from said work log successive accesses to the same file by different workers composing said pair, which increases according to the time wise proximity of both accesses, and calculating said relation strength by accumulating said weight.

24. The processor-executed evaluation method according to claims 17, wherein, said work log includes a cooperation log of a request and reply between the workers, and calculating said relation strength from said cooperation logs by counting the number of said cooperation logs between the workers who compose said pair.

25. An evaluation apparatus includes a processor, the evaluation apparatus comprising:

means for storing a work table including, for each of a plurality of workers who are engaged in work of development or operation of a system, a period in which the worker possessed any one of a plurality of work attributes concerning to said work, means for storing a work log recording, for each interaction among said plurality of workers, generation time of said interaction and said workers who participated in said interaction, and means for calculating from said work log and outputting relation strength, for each combination of said plurality of work attributes and said plurality of pairs of the workers, that indicates the strength of the relation between the workers composing the pair, based on number of times of said interactions within the pair that the workers composing the pair performed when having the work attribute.

* * * * *